3,494,503
STORAGE BIN
Eleanor V. Kingsley, 490 Preciado Ave.,
Pomona, Calif. 91767
Filed Dec. 18, 1967, Ser. No. 691,587
Int. Cl. A47b 57/00, 51/00; B65d 25/02
U.S. Cl. 220—93  4 Claims

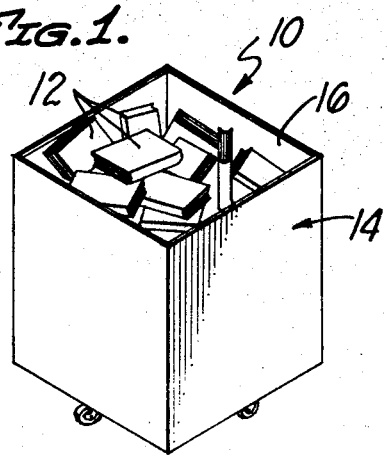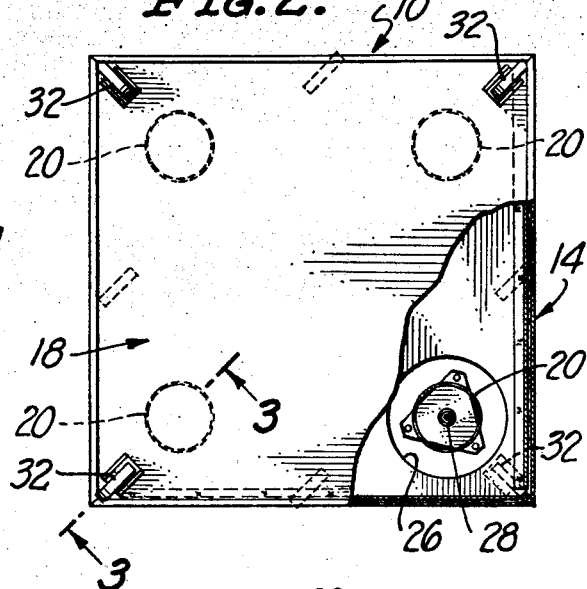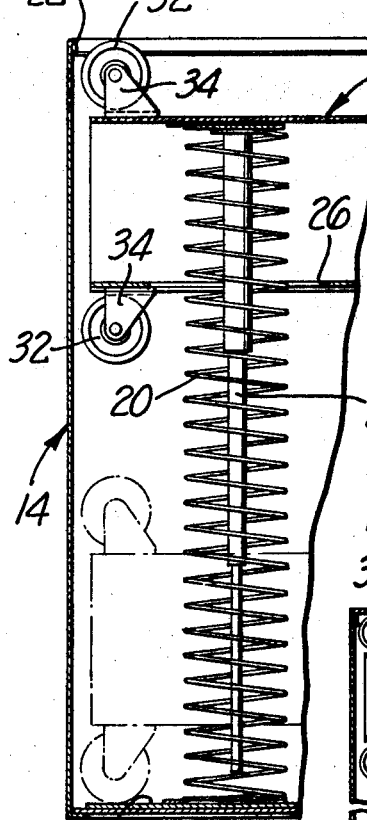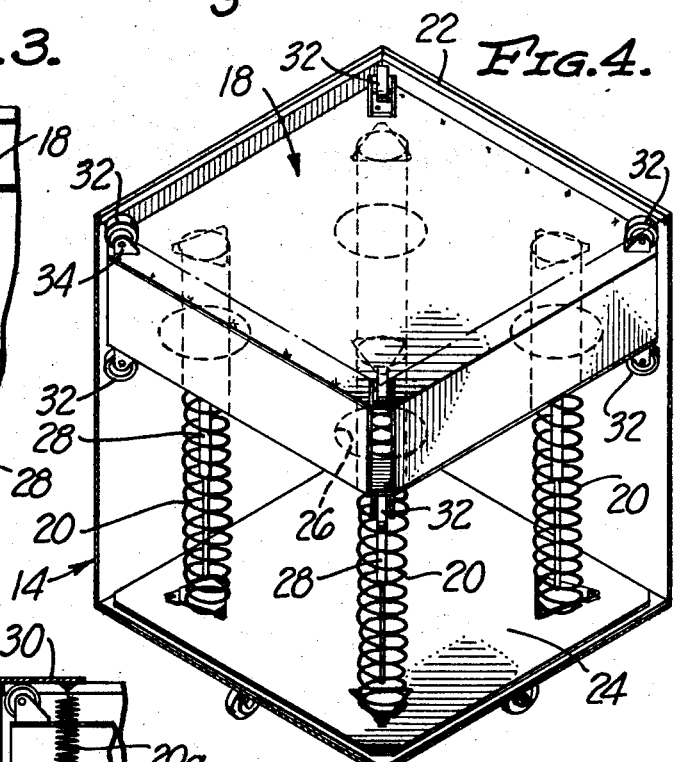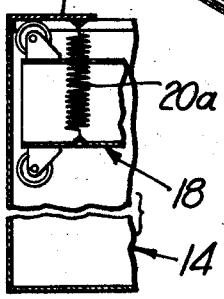

ABSTRACT OF THE DISCLOSURE

A wheeled storage bin for books and other articles, the bin having a floating, spring-loaded article supporting tray whose vertical position is adjusted automatically in response to placement of articles in and removal of articles from the bin in such a way that the uppermost articles in the bin are always conveniently accessible.

BACKGROUND OF THE INVENTION

Field of the invention

This invention relates generally to article handling devices and, more particularly, to a wheeled article storage bin whose effective depth varies automatically in response to placement of articles in and removal of articles from the bin.

Prior art

Wheeled article storage bins of the general class to which this invention pertains are known in the art and are utilized for a wide variety of article handling applications. These existing article storage bins, however, are characterized by certain inherent deficiencies which this invention seeks to overcome. One of the major deficiencies of the existing wheeled storage bins, for example, resides in the fact that they have a fixed internal depth; that is to say, the position of the bottom article supporting wall of these bins is fixed. It will be recognized, of course, that if the bin is to contain a reasonable number of articles, the bin must have a substantial depth. As a consequence, the articles located at the bottom of the existing article storage bins having fixed bottom walls are extremely difficult to retrieve.

SUMMARY OF THE INVENTION

This invention provides an improved wheeled article storage bin which avoids the above noted and other deficiencies of the existing storage bins of this class. Thus, the article storage bin of the present invention contains a floating, spring-loaded article supporting tray whose vertical position is automatically adjusted in response to placement of articles in and removal of articles from the bin. In other words, as articles are removed from the bin, the article supporting tray rises in the bin to constantly locate the uppermost articles in the bin in a conveniently accessible position. An important feature of the invention is concerned with certain guide or bearing rollers which are mounted on the tray in rolling engagement with the housing of the article storage bin to support the tray for free and unrestricted vertical movement relative to the housing. These rollers are arranged in a unique way which resists canting or wedging of the tray within the storage bin housing under non-uniform loading of the tray by the articles placed thereon. The invention also possesses certain other novel and beneficial features which become evident as the description proceeds.

It will be evident to those versed in the art that the present wheeled article storage bin may be utilized for a wide variety of article handling applications. However, the present storage bin is intended principally for use in libraries, and the like, for transporting books from one location to another. For this reason, the invention will be disclosed herein in connection with this particular application.

BRIEF DESCRIPTION OF THE DRAWINGS

FIGURE 1 is a perspective view of a wheeled article or book storage bin according to the invention showing a number of books within the bin;

FIGURE 2 is an enlarged top plan view of the bin with parts broken away for the sake of clarity;

FIGURE 3 is an enlarged section taken on line 3—3 of FIGURE 2;

FIGURE 4 is a perspective view of the present article or book storage bin with the two forward side walls removed for the sake of clarity; and FIGURE 5 illustrates a modified storage bin.

Turning now to these drawings, there is illustrated an article storage bin 10 according to the invention which is intended primarily for use in libraries, and the like, for transporting books 12 from one location to another within the library. Storage bin 10 includes a normally upright housing 14 of generally rectangular shape in horizontal section. This housing has an open top 16. Positioned within and generally complementing the interior of the housing 14 is a normally horizontal, vertically floating article supporting tray 18. This tray is free to move vertically within the housing. Operatively connected between the housing 14 and the tray 18 are springs 20 for yieldably urging the tray upwardly in the housing. Suitable limit stop means, in this instance a flange 22 which extends circumferentially about the open top of the housing 14, is provided for limiting elevation of the tray 18 under spring action.

In most if not all applications of the present article storage bin 10, including the illustrated library book application, the article supporting tray 18 must be relatively rigid to carry the weight of the articles supported thereon without undesirable bending or other deformation of the tray. For this reason, the illustrated article supporting tray 18 has a hollow box-like construction. This tray is composed of two generally channel-shaped sections which are inverted relative to one another and disposed in interfitting relation with their open sides facing one another and with the flanges of each section positioned between and at right angles to the flanges of the other section. The flanges of one section thus provide two opposite side walls of the tray and the flanges of the other section provide the two remaining opposite tray side walls. The two sections are then welded together to provide the illustrated box shape. Obviously, of course, the tray may be constructed in other ways.

The drawings illustrate two different spring arrangements for yieldably supporting the tray 18. In FIGURE 4, for example, the springs 20 are compression springs which are positioned between and seat against the tray 18 and the bottom wall 24 of the storage bin housing 14. In this case, the upper ends of the springs 20 may extend through openings 26 in the bottom wall of the tray 18 to permit the upper ends of the springs to seat directly against the upper load-bearing wall of the tray. Telescopic spring retainers 28 are provided for restraining the tray springs 20 against lateral bowing or buckling under load. The spring retainers 28 may assume various forms. The particular retainers illustrated comprise telescopic rods which extend centrally through the springs 20 and are secured at their ends to the tray 18 and the bottom housing wall 24.

FIGURE 5 illustrates, in fragmentary fashion, an alternative method of resiliently supporting or suspending the tray 18 of the present article storage bin 10. In this case, the springs 20a comprise tension springs which are connected between the tray 18 of the storage bin and corner members 30 which are welded or otherwise secured to the upper end of and extend across the corners of the storage bin housing 14.

It is evident, of course, that the article supporting tray 18 of the present article storage bin 10 may not and generally will not be always uniformly loaded. In many cases, for example, the books 12, or other articles, may be thrown, dropped, or stacked in the bin in such a way as to produce non-uniform loading of the tray. This non-uniform loading of the tray, of course, will tend to cant the tray relative to the storage bin housing 14 and thereby wedge the tray in the housing. To avoid this problem, and in general to promote free and unrestricted floating movement of the tray 18 within the housing 14, the tray is equipped with bearing or guide rollers 32. These rollers are attached to the tray by means of brackets 34. In this instance, each corner of the tray mounts a pair of the guide rollers 32. The rollers of each roller pair are located above and below the tray, as shown. According to a feature of the invention, the guide rollers 32 are disposed in vertical diagonal planes of the tray 18, and hence the storage bin housing 14. As a consequence, the bearing rollers engage within the internal corners of the housing and are disposed in rolling contact with the adjacent housing side walls.

It is now evident that when the article storage bin 10 is empty, the springs 20 or 20a urge the tray 18 of the bin to its upper limiting position shown in solid lines in FIGURE 3 and in FIGURE 4. In this elevated position, the upper surface of the tray is substantially flush with the top opening in the storage bin housing 14. When articles, such as the illustrated books 12, are placed in the bin, the weight of the articles depresses the tray downwardly against spring action. Accordingly, the tray automatically lowers as articles are placed in the storage bin and rises as the articles are removed from the bin. In this way, the uppermost articles in the bin are always immediately accessible to the top opening in the storage bin housing 14. As already noted, the diagonal tray guide rollers 32 restrain the article supporting tray 18 against canting relative to and thereby wedging in the housing 14.

What is claimed as new in support of Letters Patent is:

1. A wheeled self-adjusting article storage bin comprising:
   a normally upright housing of generally rectangular shape in horizontal section and having an open top,
   a normally horizontal, vertically floating article supporting tray in said housing,
   springs connected between said housing and tray for yieldably urging said tray in the upward direction relative to said housing, whereby said tray lowers as said bin is filled with articles and rises when the articles are removed, thus to constantly locate the uppermost articles in the bin at a conveniently accessible level,
   said tray having a hollow box-like construction and including upper and lower walls and edge walls joining said upper and lower walls,
   said bin comprising a pair of vertically spaced guide rollers mounted on said tray at each corner thereof above and below the tray, respectively, and
   the rollers of each roller pair being disposed in a common vertical diagonal plane of and engaged within the adjacent inside corner of said housing, whereby said tray is restrained against canting relative to said housing under non-uniform loading of said tray.

2. An article storage bin according to claim 1 wherein:
   said tray comprising two channel-shaped sections which are inverted relative to one another and disposed in interfitting relation with their open sides facing one another and with the flanges of each section positioned between and at right angles to the flanges of the other section, whereby the flanges of one section provide two opposite edge walls of said tray and the flanges of the other section provide the two remaining opposite tray walls.

3. An article storage bin according to claim 1 wherein:
   said springs are compression springs extending between the bottom of said housing and the top wall of said tray and through openings in the bottom wall of said tray, whereby vertical loading of said tray tends to compress said springs.

4. An article storage bin according to claim 1 wherein:
   said springs are tension springs extending between the top of said housing and the bottom wall of said tray and through openings in the top wall of said tray, whereby vertical loading of said tray tends to extend said springs.

References Cited

UNITED STATES PATENTS

| | | | |
|---|---|---|---|
| 1,161,694 | 11/1915 | La Brade | 220—93 |
| 2,717,085 | 9/1955 | Waddington | 220—93 X |
| 2,802,575 | 8/1957 | Harrison. | |
| 2,816,808 | 12/1957 | Haines | 312—71 |
| 2,850,203 | 9/1958 | Eurey | 220—93 |
| 3,168,198 | 2/1965 | Shelley. | |
| 3,291,339 | 12/1966 | Hein | 312—71 X |
| 3,291,544 | 12/1966 | Ord | 312—71 |
| 3,388,677 | 6/1968 | MacKay | 211—49 X |

RAPHAEL H. SCHWARTZ, Primary Examiner

U.S. Cl. X.R.

312—312